United States Patent
Koh et al.

(10) Patent No.: US 8,630,606 B2
(45) Date of Patent: Jan. 14, 2014

(54) COMMUNICATIONS TERMINALS FOR REDUCING POWER CONSUMPTION AND METHODS THEREOF

(75) Inventors: Tien Ming Benjamin Koh, Singapore (SG); Peng Bin, Singapore (SG); Pek Yew Tan, Singapore (SG); Yosuke Matsushita, Osaka (JP); Yuki Ohira, Osaka (JP)

(73) Assignee: Panasonic Corporation, Osaka (JP)

( * ) Notice: Subject to any disclaimer, the term of this patent is extended or adjusted under 35 U.S.C. 154(b) by 178 days.

(21) Appl. No.: 13/377,894

(22) PCT Filed: Apr. 11, 2011

(86) PCT No.: PCT/JP2011/002116
§ 371 (c)(1),
(2), (4) Date: Dec. 13, 2011

(87) PCT Pub. No.: WO2011/129086
PCT Pub. Date: Oct. 20, 2011

(65) Prior Publication Data
US 2012/0083200 A1 Apr. 5, 2012

(30) Foreign Application Priority Data

Apr. 14, 2010 (JP) .................................. 2010-093580

(51) Int. Cl.
*H04B 1/16* (2006.01)
*H04W 4/00* (2009.01)
(52) U.S. Cl.
USPC ..................... 455/343.4; 455/435.1; 455/574
(58) Field of Classification Search
USPC .......................... 455/343.1, 343.4, 517, 574
See application file for complete search history.

(56) References Cited

U.S. PATENT DOCUMENTS

| 8,478,360 B2* | 7/2013 | Soliman ........................ 455/574 |
| 2003/0203740 A1* | 10/2003 | Bahl et al. ..................... 455/516 |
| 2005/0107134 A1 | 5/2005 | Morioka et al. |
| 2006/0087993 A1* | 4/2006 | Sengupta et al. ............. 370/310 |

(Continued)

FOREIGN PATENT DOCUMENTS

| JP | 2004/152268 | 5/2004 |
| JP | 2006-203868 | 8/2006 |

(Continued)

OTHER PUBLICATIONS

International Search Report issued May 17, 2011 in International (PCT) Application No. PCT/JP2011/002116.

*Primary Examiner* — Blane J Jackson
(74) *Attorney, Agent, or Firm* — Wenderoth, Lind & Ponack, L.L.P.

(57) ABSTRACT

A communications terminal registered as a controlled terminal in a controlling terminal which controls the controlled terminal via a communications network, the communications terminal includes a receiving unit (15020) which receives a sleep message including information indicating whether or not the controlling terminal is sleeping and information indicating a timing when the controlling terminal leaves sleep mode and wakes up; a detecting unit (15030) which detects a transmission of a registration request for requesting that a new terminal be registered in the controlling terminal as a new controlled terminal, the new terminal being another communications terminal not yet registered in the controlling terminal; and a notifying unit (15040) which determines whether or not the controlling terminal is sleeping based on the sleep message, and notifies the new terminal of the timing by sending the sleep message when the controlling terminal is sleeping and when the transmission of the registration request is detected.

20 Claims, 15 Drawing Sheets

(56) References Cited

U.S. PATENT DOCUMENTS

2006/0128351 A1    6/2006    Hassan et al.
2006/0129850 A1    6/2006    Hassan et al.
2009/0221261 A1*    9/2009    Soliman ..................... 455/343.2

FOREIGN PATENT DOCUMENTS

| | | |
|---|---|---|
| JP | 2009-94579 | 4/2009 |
| JP | 2010-57072 | 3/2010 |
| WO | 2004/034644 | 4/2004 |

\* cited by examiner

FIG. 3

| Type | Sleep Period | Wake Period | Remaining Time | Source-Identifier |
|---|---|---|---|---|
| 2001 | 2010 | 2020 | 3010 | 3020 |

COMMUNICATIONS TERMINALS FOR REDUCING POWER CONSUMPTION AND METHODS THEREOF

TECHNICAL FIELD

The present disclosure relates to a communications terminal registered, as a controlled terminal, in a controlling terminal.

BACKGROUND ART

In recent years, the technology for causing networked devices to autonomously cooperate with each other has been considered with an aim to improve intelligence, functionality, user convenience or energy efficiency. In this technology, it is preferable that each device communicate autonomously as much as possible to save the user's time.

Meanwhile, in order to improve energy efficiency, each device preferably reduces the amount of communication as much as possible. In addition, when a user is not using a device, it is preferable that the device be in low operating mode in which message transmitting and receiving is not performed at all. Such low power operating mode is commonly known as sleep mode.

Devices having sleep mode have two modes: sleep mode during which messages are not, sent or received and active mode during which messages are sent and received. The devices wake up at a particular timing during sleep mode and switch to active mode. Furthermore, the devices switch to sleep mode at a particular timing during active mode.

Note that communications devices having two modes: sleep mode and active mode are described in the Patent Literature 1.

CITATION LIST

Patent Literature

[PTL 1] Japanese Unexamined Patent Application Publication No.

SUMMARY OF INVENTION

Technical Problem

However, one disadvantage of devices during conventional sleep mode is that they are not able to send or receive messages from other devices. Other devices are not able to receive a reply when they sent a message to a device in sleep mode. Therefore, other devices may repeatedly send messages. Thus, unnecessary power is consumed as other devices retransmit messages many times.

Meanwhile, there is a sleep mode with valid communication function so that a device in sleep mode can receive messages. However, such a sleep mode still consumes vast amounts of power compared to the conventional sleep mode. This is because a device in the sleep mode with valid communication function receives all receivable data packets, regardless of whether the packets are sent to the device itself or to other devices. This decreases energy efficiency.

It is an object of one embodiment of the present invention to provide communications terminals which reduce power consumption more efficiently during sleep mode.

Solution to Problem

In order to solve the above-mentioned problem, the communications terminal according to the one embodiment of the present invention is a communications terminal registered, as a controlled terminal, in a controlling terminal which controls the controlled terminal via a communications network.

The communications terminal includes: a receiving unit which receives a sleep message including information indicating a timing when the controlling terminal leaves sleep mode and wakes up; a detecting unit which detects a transmission of a registration request for requesting that a new terminal be registered in the controlling terminal as a new controlled terminal, the new terminal being another communications terminal not yet registered in the controlling terminal; and a notifying unit which determines whether or not the controlling terminal is sleeping based on the sleep message, and notifies the new terminal of the timing by sending the sleep message when the controlling terminal is sleeping and when the transmission of the registration request is detected.

In addition, the communications terminal according to the another embodiment of the present invention may be a communications terminal including: a transmission unit which transmits a registration request for requesting that the communications terminal be registered, as a new controlled terminal, in a controlling terminal which controls controlled terminals via a communications network; a receiving unit which receives a sleep message including information indicating a timing when the controlling terminal wakes up, from a registered terminal which is another communications terminal registered in the controlling terminal; and a transmission control unit which controls a transmission of the registration request so that the transmission of the registration request is placed on standby and the registration request is sent after the arrival of the timing, when the sleep message is received.

Note that embodiments of the present invention not only can be achieved as a device, but also can be achieved as an integrated circuit including processing means that such a device has, a control method in which processing means constituting the device are steps, or a program which causes computers to execute these steps.

Advantageous Effects of Invention

The communications terminals according to the one embodiment of the present invention can reduce power consumption more efficiently during sleep mode.

BRIEF DESCRIPTION OF DRAWINGS

FIG. 3 shows Information Elements of a Sleep-Inform message according to Embodiment 1.

DESCRIPTION OF EMBODIMENTS

Figure 1:
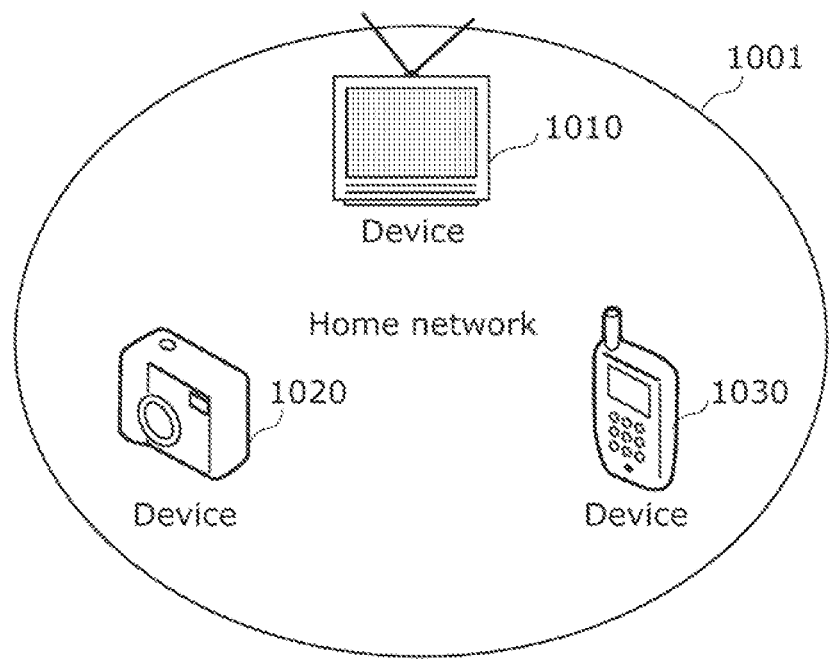
FIG. 1 is a diagram of network configuration according to Embodiment 1.

The communications terminal according to an embodiment of the present invention is a communications terminal registered, as a controlled terminal, in a controlling terminal which controls the controlled terminal via a communications network, the communications terminal including: a receiving unit which receives a sleep message including information indicating a timing when the controlling terminal leaves sleep mode and wakes up; a detecting unit which detects a transmission of a registration request for requesting that a new terminal be registered in the controlling terminal as a new controlled terminal, the new terminal being another communications terminal not yet registered in the controlling terminal; and a notifying unit which determines whether or not the controlling terminal is sleeping based on the sleep message, and notifies the new terminal of the timing by sending the sleep message when the controlling terminal is sleeping and when the transmission of the registration request is detected.

According to the embodiment, the communications terminal sends the sleep message when the controlling terminal is sleeping (i.e., in sleep mode). Thus, the communications terminal notifies the new terminal of the wake-up timing of the controlling terminal. In other words, on behalf of the controlling terminal, the communications terminal registered in the controlling terminal notifies the new terminal of the wake-up timing.

This reduces the number of registration requests that the new terminal retransmits without recognizing that the controlling terminal is asleep. As a result, unnecessary electric power consumed by the new terminal is reduced.

In addition, the new terminal, for example, can also stay in sleep mode until the controlling terminal wakes up, by recognizing the wake-up timing. As a result, unnecessary electric power consumed by the new terminal is reduced.

In addition, the notifying unit may determine that the controlling terminal is not sleeping (is active) when a value of information is equal to or smaller than zero, and determine that the controlling terminal is sleeping when the value is larger than zero.

Further, the notifying unit does not have to send the sleep message when the controlling terminal is not sleeping.

According to the embodiment, the communications terminal does not notify the new terminal of the wake-up timing of the controlling terminal when the controlling terminal is not in sleep mode, i.e., the controlling terminal is in active mode. Thus, unnecessary transmission is reduced when timing notification is not needed. Accordingly, both power consumption and communications traffic are reduced.

In addition, the receiving unit may receive the sleep message including information indicating a length of time from when the controlling terminal wakes up till when the controlling terminal enters sleep mode next, and the notifying unit may notify, by sending the sleep message, the new terminal of the length of time from when the controlling terminal wakes up till when the controlling terminal enters sleep mode next.

According to the embodiment, the communications terminal notifies the new terminal of the length of time that the controlling terminal will remain in active mode after waking up. This allows the new terminal to recognize the active mode period during which the transmission of registration requests is valid. Therefore, the new terminal can adjust a timing when it transmits a registration request to the controlling terminal in active mode.

For example, shortly after the controlling terminal wakes up, a plurality of other new terminals may communicate at once with the controlling terminal. In this case, collisions occur on the communications network, resulting in lower communication efficiency.

Therefore, according to the embodiment, after the controlling terminal wakes up, the new terminal waits for a predetermined time to be able to transmit the registration request at an arbitrary timing within the active mode period. Accordingly, the communications terminal according to the invention can decrease the possibility of in collisions on the communications network.

In addition, the notifying unit may notify the new terminal of the timing by sending the sleep message to a relay destination terminal, and causing the relay destination terminal to relay the sleep message, the relay destination terminal being another communications terminal registered in the controlling terminal.

According to the embodiment, the communications terminal causes another communications terminal to relay the sleep message. This enables the communications terminal according to the invention to also enter sleep mode.

In addition, the notifying unit may notify the timing by setting information in the sleep message and sending the sleep message, the information indicating a remaining time from when the receiving unit receives the sleep message till when the controlling terminal wakes up.

The wake-up timing of the controlling terminal may be indicated by the length of time from when the controlling terminal sends the sleep message. However, in this case, a time lag occurs from when the controlling terminal sends the sleep message till when the receiving unit receives the sleep message relayed by another communications terminal. Then, the new terminal which received the sleep message may not be able to recognize accurate wake-up timing.

According to the embodiment, the communications terminal relaying the sleep message sets information pertaining to remaining time in the sleep message. Therefore, the terminal can recognize the accurate wake-up timing of the controlling terminal.

In addition, the notifying unit may notify the timing by setting information in the sleep message and sending the sleep message, the information indicating a remaining time from when the detecting unit detects the transmission of the registration request till when the controlling terminal wakes up.

According to the embodiment, the communications terminal sets the remaining time from when it detects the transmission of the registration request till when the controlling terminal wakes up. This allows the new terminal to recognize the accurate wake-up timing of the controlling terminal.

In addition, the receiving unit may receive the sleep message relayed by a relay source terminal which is another communications terminal registered in the communications terminal.

According to the embodiment, after a relay source terminal relays a sleep message sent by a controlling terminal, a communications terminal receives the sleep message.

For example, when the communications terminal is in sleep mode, it cannot receive the sleep message from the controlling terminal. Therefore, the controlling terminal tentatively sends the sleep message to the relay source terminal in active mode. After the communications terminal goes into active mode, the relay source terminal sends the sleep message to the communications terminal. This enables the communications terminal to receive the sleep message.

In addition, a plurality of controlling terminals each of which is the controlling terminal sending the sleep message may be provided on the communications network, the receiving unit may receive the sleep message including information to identify, from the controlling terminals, the controlling terminal which sent the sleep message, and the detecting unit may detect the transmission of the registration request to the controlling terminal identified by the sleep message.

Multiple controlling terminals may exist on the communications network and enter sleep mode. Even in such a case, the communications terminal can notify the new terminal of the wake-up timing of the controlling terminal to which the new terminal is requesting registration.

In addition, the communications terminal may further include a display unit which displays sleep information indicating whether or not the controlling terminal is sleeping.

According to the embodiment, the communications terminal displays information indicating whether or not the controlling terminal is sleeping. Thus, the communications terminal can notify the user of the need to wake up the controlling terminal, for communication between the new terminal and the controlling terminal. As a result, the user can wake up the controlling terminal to register the new terminal when she/he wants.

In addition, the notifying unit may further send a display request to a display terminal that is a communications terminal provided with a display unit, and cause the display unit to display sleep information, the display request for requesting the display of the sleep information indicating whether or not the controlling terminal is sleeping.

Thus, even if the communications terminal itself does not have display function, the communications terminal can notify the user to wake up the controlling terminal via another communications terminal.

In addition, the notifying unit may wait for a randomized time after the detecting unit detects the transmission of the registration request, and send the display request to the display terminal in order to cause the display unit to display the sleep information.

For example, when the new terminal broadcasted the registration request, a plurality of communications terminals which to detected the transmission of the registration request may simultaneously send display requests. Then, this may lead to collisions on the communications network.

According to the embodiment, the transmission timing of the display request will be delayed according to a randomized time period. Therefore, the possibility of collisions decreases.

In addition, the notifying unit may cause the display unit to display the sleep information before notifying the new terminal of the timing.

According to the embodiment, display processing is performed ahead of timing notification. Thus, the communications terminal according to the invention prevents the new terminal from going into sleep mode although the controlling terminal is no longer in sleep mode.

In addition, the notifying unit may notify the timing by notifying the time when the controlling terminal will wake up, the length of time from when the controlling terminal enters sleep mode till when the controlling terminal wakes up, or a predetermined sleep pattern.

This enables the notifying unit to accurately notify the wake-up timing of the controlling terminal.

In addition, the communications terminal according to an embodiment of the present invention may be a communications terminal including: a transmission unit which transmits a registration request for requesting that the communications terminal be registered, as a new controlled terminal, in a controlling terminal which controls controlled terminals via a communications network; a receiving unit which receives a sleep message including information indicating a timing when the controlling terminal wakes up, from a registered terminal which is another communications terminal in registered in the controlling terminal; and a transmission control unit which controls a transmission of the registration request so that the transmission of the registration request is placed on standby and the registration request is sent after the arrival of the timing, when the sleep message is received.

According to the embodiment, when receiving the sleep message, the communications terminal places the transmission of the registration request on standby and after wake-up timing, the communications terminal sends the registration request. Thus, the communications terminal places the transmission of the registration request on standby during the sleep mode of the controlling terminal. Therefore, unnecessary power consumption is reduced.

In addition, the transmission control unit may place the communications terminal itself into sleep mode during the time from the receipt of the sleep message until the arrival of the timing.

According to the embodiment, the communications terminal places itself into sleep mode during the period from when it receives the sleep message till when wake-up timing comes. Therefore, electricity consumption is further reduced during the period from the receipt of the sleep message to the arrival of the wake-up timing.

In addition, the communications method according to an embodiment of the present invention may be a communications method used in a communications terminal that is registered as a controlled terminal, in a controlling terminal which controls the controlled terminal via a communications network, the communications method including: receiving a sleep message including information indicating a timing from when the controlling terminal leaves sleep mode and wakes up; detecting a transmission of a registration request for requesting that a new terminal be registered in the controlling terminal as a new controlled terminal, the new terminal being another communications terminal not yet registered in the controlling terminal; and notifying the new terminal of the timing by determining whether or not the controlling terminal is sleeping based on the sleep message, and sending the sleep message when the controlling terminal is sleeping and when the transmission of the registration request is detected.

In addition, the communications method according to an embodiment of the present invention may be a communications method used in a communications terminal, the communications method including: sending a registration request for requesting that the communications terminal be registered, as a new controlled terminal, in a controlling terminal which controls controlled terminals via a communications network; receiving a sleep message including information indicating a timing when the controlling terminal wakes up, from a registered terminal which is another communications terminal registered in the controlling terminal; and controlling a transmission of the registration request so that the transmission of the registration request is placed on standby and the registration request is sent after the arrival of the timing, when the sleep message is received.

In addition, a program according to an embodiment of the present invention may be a program for causing the communications terminal to execute the communications methods.

The following describes each embodiment of the present invention with reference to drawings. Note that even if specific numerical value, time, structure, protocol and other parameters, which are used in the following description, vary, it is obvious for those skilled in the art that the present invention can be implemented by the following description.

[EMBODIMENT 1]

FIG. 1 is a diagram of network configuration according to Embodiment 1. Three Devices 1010, 1020 and 1030 exist in the home network 1001 shown in FIG. 1. The home network 1001 is an example of communications network. The home network 1001 is typically network within a home. In addition, the home network 1001 may be wired or wireless.

Three Devices 1010, 1020 and 1030 are communications terminals that mutually communicate via the home network 1001. Three Devices 1010, 1020 and 1030 may be home appliances.

The Device 1010 is a master device that manages the home network 1001. Then, the Device 1010 controls the Device 1020, etc. registered as controlled terminals. Here, the Device 1010 is also called a controlling terminal.

For example, the Device 1010 stores the list of network devices such as the Device 1020 and others registered as controlled terminals. The Device 1010 also assigns a usable address in the home network 1001 to the Device 1020 and others. The Device 1010 also routes data packets between devices. The Device 1010 also distributes security keys. The Device 1010 also collects various information from the Device 1020 and others. The Device 1010 also performs other operations pertaining to the above-mentioned operations.

The Device 1020, which is already registered in the Device 1010, is an existing slave device controlled by the Device 1010. The Device 1030 is a new slave device which is yet to be registered in the Device 1010. Here, the Device 1030 is also called a new terminal.

[Notification Method from Master Device to Existing Slave Device]

Depending on the user's preference or the policy defined in the Device 1010, the Device 1010 decides to enter sleep mode in order to save power.

Sleep mode means that the Device 1010 and others are in electric power saving mode compared to when they are in normal operation mode. On the other hand, normal operation mode is called active mode. In addition, switching from active mode to sleep mode in the Device 1010 and others may be explained that the Device 1010 and others enter sleep mode. In contrast, switching from sleep mode to active mode in the Device 1010 and others may be explained that the Device 1010 and others wake up.

There are various ways to achieve sleep mode. Here, sleep mode particularly means the mode in which communications modules having communications function stop. The Device 1010 and others can reduce electricity consumption by stopping power supply to the communications modules during sleep mode.

However, the aspect of sleep mode is not limited to stopped communications function. For example, sleep mode may be the aspect in which power supply to the Device 1010 itself completely stops. Otherwise, sleep mode may be the aspect in which the operations of some of the units included in the Device 1010 and others stop.

The timing when the Device 1010 and others enter sleep mode and wake up is set by the user in advance. Alternatively, applications installed in the Device 1010 and others may determine such timing. Alternatively, other devices may specify such timing.

For example, the master Device 1010 collects information on electric power and others once an hour from the Device 1020 and others registered as controlled terminals. Then, the Device 1010 stays in sleep mode except when collecting information. In this case, the Device 1010, for example, repeats the 5-minute active mode and the 55-minute sleep mode.

Figure 2:
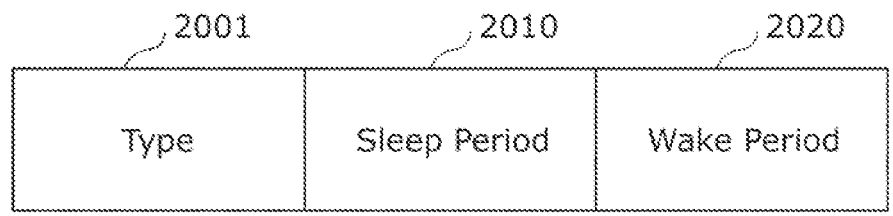
FIG. 2 shows Information Elements of a Sleep-Info message according to Embodiment 1.

FIG. 2 shows the Sleep-Info message that the master Device 1010 transmits before entering sleep mode. The Device 1010 broadcasts the Sleep-Info message containing Information Elements (IEs) shown in FIG. 2. Thus, the Device 1010 notifies existing slave devices of its entering sleep mode. The broadcasting of the Sleep-Info message may be performed by any protocols.

For example, a beacon message specified by IEEE 802.15.4 may be used for broadcasting. In this case, new IEs are inserted into the beacon. In addition, IEs can also be carried over wired (IEEE 802.3) or wireless (IEE 802.11) LAN using a specific broadcast message according to the configuration of the home network 1001.

[Sleep-Info Message]

The Type 2001 shown in FIG. 2 is used to identify that this message is a Sleep-Info message.

Sleep Period 2010 is information indicating the length of time that sleep mode will continue from when the device which sent a Sleep-Info message enters sleep mode till when it wakes up. Equal to or smaller than zero (a negative value) of this value means that the device which sent the Sleep-Info message is in active mode.

Wake Period 2020 is information indicating the length of time that active mode will continue from when the device which sent the Sleep-Info message wakes up till when it starts its next sleep mode.

Period information is given in relative term (length) rather than specific wake-up time (time point). Thus, even when clocks are not synchronized between devices within the home network 1001, the Sleep-Info message still works.

The Device 1010, the sender of the Sleep-Info message, typically goes into sleep mode immediately after sending the message. However, the Device 1010 may enter sleep mode after a predetermined delay period. At this time, other devices in the home network 1001 may set the delay period.

[Synchronized Clock Operation]

When the clocks in the devices within the home network 1001 are synchronized, specific time (time point) when a sender enters sleep mode may be specified. In this case, Start-Time may be added to the Sleep-Info message shown in FIG. 2.

[Sleep-Info Message Containing Sleep Pattern]

In addition, all nodes (devices) may have predetermined various sleep patterns. In such a case, the Sleep-Info message may only contain the Type 2001 and a sleep pattern as IEs.

Here, a sleep pattern, for example, is defined as the 5 units of receiving time in active mode followed by the 100 units of time of sleep mode. More specifically, a cyclical operation based on a fixed time interval may be determined beforehand as a sleep pattern, such that the 1-minute active mode and the 5-minuite sleep mode are repeated.

Then, the value of number that has a predetermined significance may be used as IEs to identify a specific sleep pattern from a plurality of sleep patterns. When there is only one sleep pattern for sleep mode, the Sleep-Info message may simply consist of the Type 2001.

[Unicast Transmission of Sleep-Info Message]

In addition, a Sleep-Info message may not be broadcasted but sent to specific nodes or node. This is advantageous when there is a specific back up device which can replace the master Device 1010. This is also advantageous when a scheme exists to ensure that a specific device within the home network 1001 can be woken up at any time. In this case, the Device 1010 sends the Sleep-Info message to another specific device in active mode when the Device 1010 is asleep. [Relay of Sleep-Inform Message]

In addition, throughout the sleep mode period of the Device 1010, multiple devices may enter active mode in turn rather than a single device being in active mode. In this case, it is possible for the device which received sleep information to propagate the information by sending a Sleep-Inform message to the next device scheduled to enter active mode.

FIG. 3 shows the Sleep-Inform message. Along with IEs of the Sleep-Info message shown in FIG. 2, Remaining Time 3010 and Source-Identifier 3020 are added to the Sleep-Inform message shown in FIG. 3.

The Remaining Time 3010 is information indicating the remaining units of time before the original sender of the Sleep-Info message goes into active mode.

The Source-Identifier 3020 is information indicating the identifier of the original sender device of the Sleep-Inform message.

The Remaining Time 3010 may be the length of time from when the Device 1020 receives the Sleep-Info message till when the Device 1010 wakes up. Thus, even when a plurality of communications terminals relay the Sleep-Inform message and a time lag occurs from the time when the Sleep-Info message was sent, appropriate time is set in the Remaining Time 3010.

In addition, the length of time from when the Device 1020 detects the transmission of a registration request till when the Device 1010 wakes up may be set in the Remaining Time 3010. Thus, more appropriate time is set in the Remaining Time 3010.

[When Only A Single Master Device Exists]

Furthermore, assuming that the original sender of sleep information is always a single master device, the Source-Identifier 3020 is unnecessary.

[New Device Starts Registration Procedures]

The Device 1010 goes into sleep mode after notifying the Device 1020 of its sleep period. The New Device 1030 tries to communicate with the Device 1010 in order to enter the home network 1001 during the sleep mode of the Device 1010. This request may be sent by a beacon request message from IEEE 802.15.4, an association request message, any similar message, or a message in accordance with a format of another protocol.

The Device 1020 detects that the Device 1030 is trying to communicate with the Device 1010 and then sends a Sleep-Inform message to the Device 1030. The Device 1030 checks the Remaining Time 3010 shown in the Sleep-Inform message and waits during the Remaining Time 3010 before trying to communicate with the master device again.

[Device Configuration]

Figure 4:
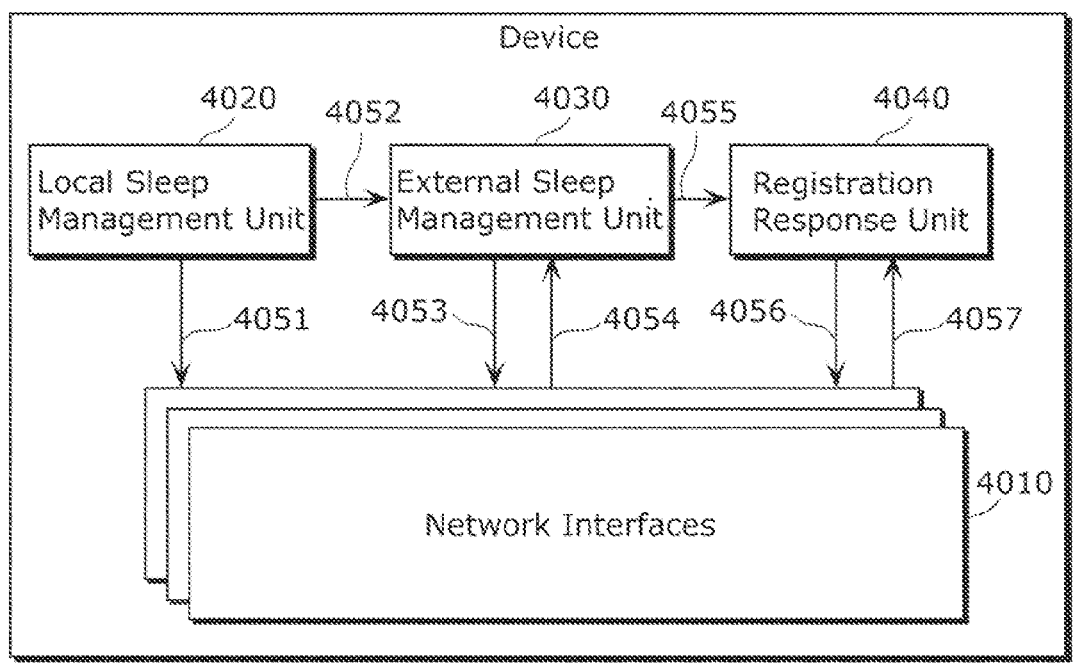
FIG. 4 is a block diagram of device according to Embodiment 1.

FIG. 4 shows a block diagram of devices according to Embodiment 1. The devices shown in FIG. 4 have the Local Sleep Management Unit 4020, the External Sleep Management Unit 4030, the Registration Response Unit 4040 and the Network Interfaces 4010. The three Devices 1010, 1020 and 1030 shown in FIG. 1 are equivalent to each other and each of them may have the components shown in FIG. 4.

The Local Sleep Management Unit 4020 manages the sleep function of the device itself. The External Sleep Management Unit 4030 stores information on the sleep mode of other devices within the home network 1001. The Registration Response Unit 4040 processes and replies to messages pertaining to registration requests from new devices. The network interfaces 4010 send and receive messages. The Network Interfaces 4010 may consist of multiple access cards, each of which corresponding to a specific communications medium.

[Sleep Management]

The Local Sleep Management Unit 4020 sends a Sleep-Info message containing the appropriate IEs as described above via path 4051 and the Network Interfaces 4010 when the device itself is about to enter sleep mode.

At this time, the Local Sleep Management Unit 4020 notifies the External Sleep Management Unit 4030 of its sleep via path 4052 simultaneously. Then, when the External Sleep Management Unit 4030 has the sleep information of other devices, the External Sleep Management Unit 4030 may send the information to other devices, using a policy or another setting. In this case, the External Sleep Management Unit 4030 sends a Sleep-Inform message via path 4053 and the Network Interfaces 4010.

[External Sleep Management]

The External Sleep Management Unit 4030 receives Sleep-Info or Sleep-Inform messages from other devices via the Network Interfaces 4010 and path 4054.

When the External Sleep Management Unit 4030 received a Sleep-Info message or a Sleep-Inform message with the Sleep Period 2010 set to zero, the originator of the message is assumed to be currently in active mode. Thus, the External Sleep Management Unit 4030 instructs via path 4055, the Registration Response Unit 4040 not to respond to received registration requests.

In contrast, when receiving a Sleep-Info message or a Sleep-Inform message with the Sleep Period 2010 set to the value larger than zero, the External Sleep Management Unit 4030 instructs via path 4055, the Registration Response Unit 4040 to respond to registration requests.

Furthermore, the External Sleep Management Unit 4030 timely updates the status of the device which sent the Sleep-Info message to appropriately update the Registration Response Unit 4040.

[Response to Registration Requests]

The Registration Response Unit 4040 detects messages pertaining to registration requests via the Network Interfaces 4010 and path 4057. Then, the Registration Response Unit 4040 sends an appropriate response to the device requesting registration. For example, the Registration Response Unit 4040 creates a Sleep-Inform message and sends it via path 4056 and the Network Interfaces 4010.

Note that the Registration Response Unit 4040 may set a randomized waiting time before sending a response. Such a randomized time is created based on random numbers and others. This reduces the risk of packet collisions on media.

For example, the Registration Response Unit 4040 starts a timer of bounded random value and withholds receiving a response until the timer expires. When the timer expires without an appropriate response being received from other devices, the Registration Response Unit 4040 sends an appropriate response. At which time, the Registration Response Unit 4040 creates an updated Sleep-Inform message and sends it to the device requesting registration.

[Configuration Example Of Mater Device And Slave Device]
[Master Device]

The master device functionality may be clearly differentiated from the slave device functionality.

Figure 5:
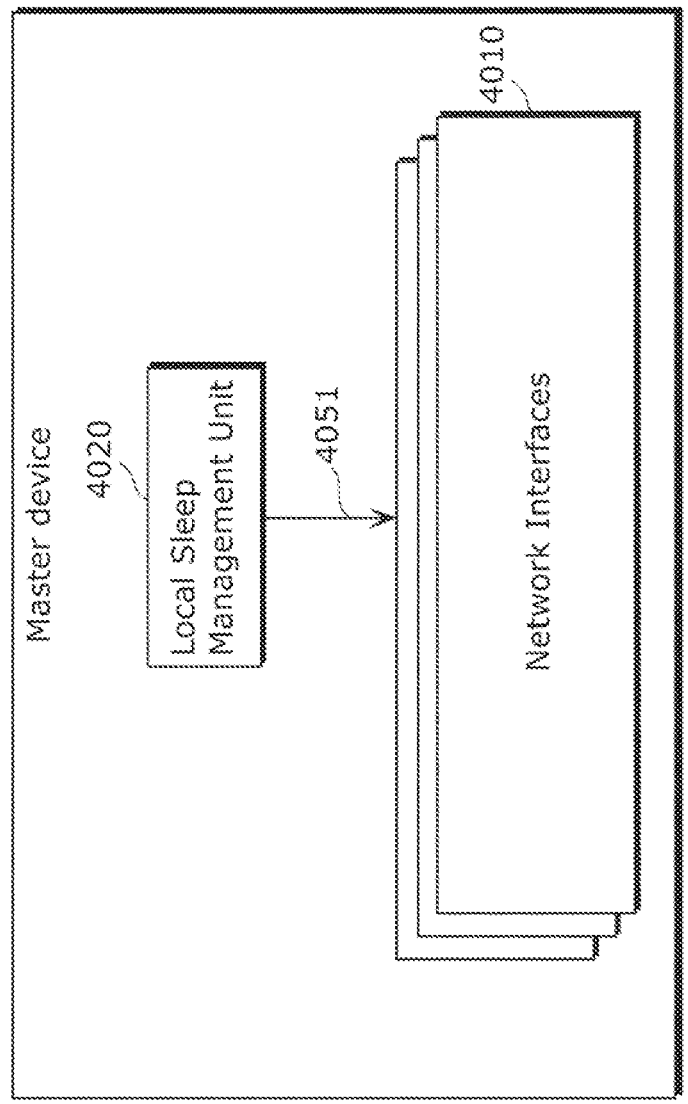
FIG. 5 is a block diagram of a master device according to Embodiment 1.

FIG. 5 shows a block diagram of a master device according to Embodiment 1. For example, the master device shown in FIG. 5 is the Device 1010 shown in FIG. 1. The master device has the Local Sleep Management Unit 4020 and the Network Interfaces 4010. When the master device is about to enter sleep mode, the Local Sleep Management Unit 4020 sends a Sleep-Info message containing the appropriate IEs as described above via path 4051 and the Network Interfaces 4010.

[Slave Device]

Figure 6:
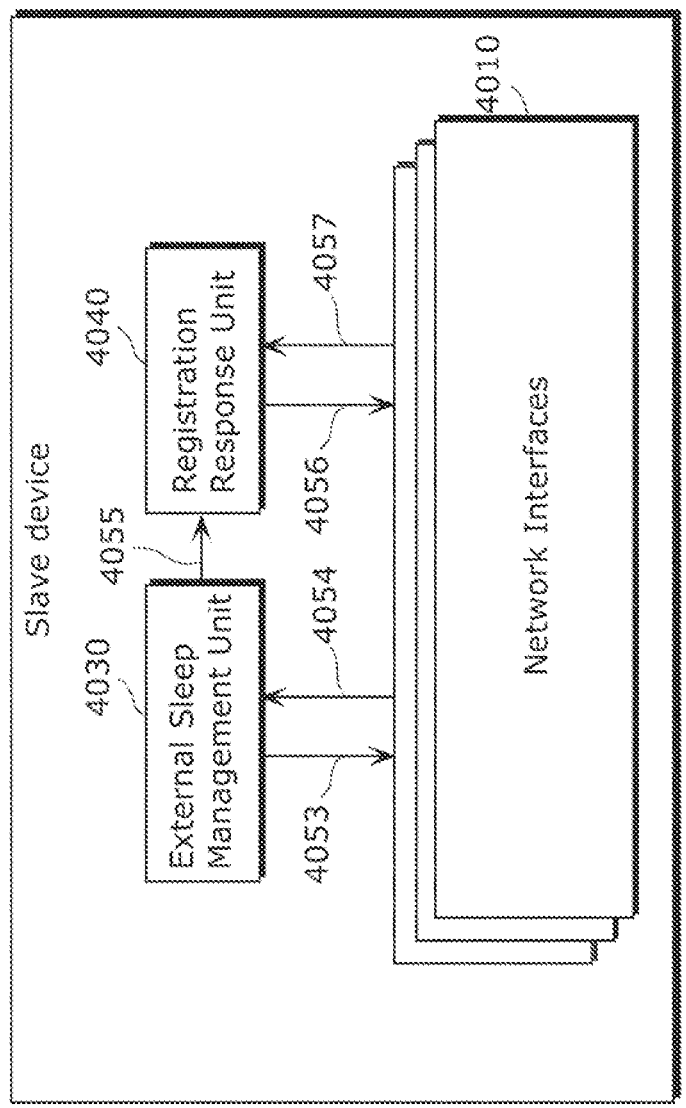
FIG. 6 is a block diagram of a slave device according to Embodiment 1.

FIG. 6 shows a block diagram of a slave device according to Embodiment 1. For example, the slave device shown in FIG. 6 is the Device 1020 shown in FIG. 1. The slave device has the External Sleep Management Unit 4030, the Registration Response Unit 4040 and the Network Interfaces 4010.

The slave device receives Sleep-Info or Sleep-Inform messages via the Network Interfaces 4010. Then, the Network Interfaces 4010 sends the messages to the External Sleep Management Unit 4030 via path 4054 for processing.

When the External Sleep Management Unit 4030 received a Sleep-Info message or a Sleep-Inform message with the Sleep Period 2010 set to equal to or smaller than zero, the originator of the message is assumed to be currently in active mode. Thus, the External Sleep Management Unit 4030 instructs the Registration Response Unit 4040 not to respond to registration requests.

In contrast, when receiving a Sleep-Info message or a Sleep-Inform message with the Sleep Period 2010 set to larger than zero, the External Sleep Management Unit 4030 instructs the Registration Response Unit 4040 to respond to registration requests. Thus, the External Sleep Management Unit 4030 plays roles of updating the status of the sender device of the Sleep-Info message and appropriately updating the Registration Response Unit 4040.

The Registration Response Unit 4040 detects messages pertaining to registration requests via the Network Interfaces 4010 and path 4057. Then, the Registration Response Unit 4040 appropriately responds. For example, it creates an updated Sleep-Inform message and sends it to the device requesting registration.

[Sleep Behavior of Master Device]

Figure 7:
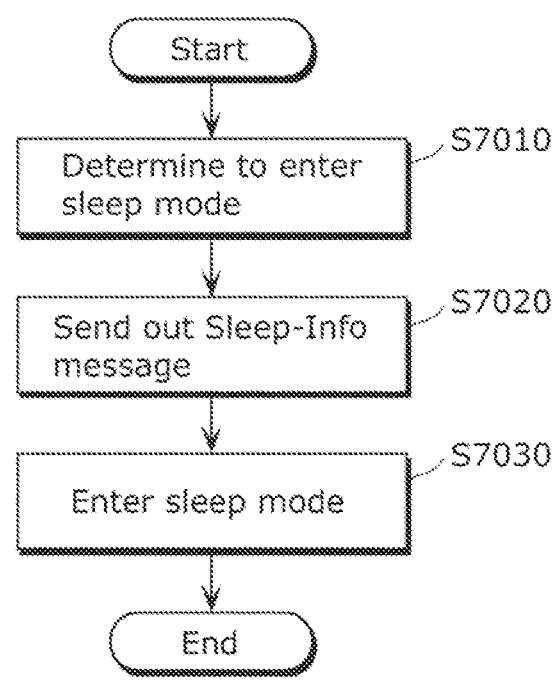
FIG. 7 is a flowchart for a master device according to Embodiment 1 that goes into sleep mode.

The following describes the behavior of various components according to Embodiment 1. FIG. 7 is a flowchart showing the behavior of the master device which will be entering sleep mode.

After the decision to enter sleep mode is made (S7010), the Local Sleep Management Unit 4020 of the master device sends a Sleep-Info message with an appropriate value lager than zero set to the Sleep Period 2010 (S7020). After sending the Sleep-Info message, the master device goes into sleep mode (S7030).

The Sleep-Info message may be broadcasted or unicasted. Furthermore, an acknowledgement is not essential.

[Wake Up Behavior of Master Device]

Figure 8:
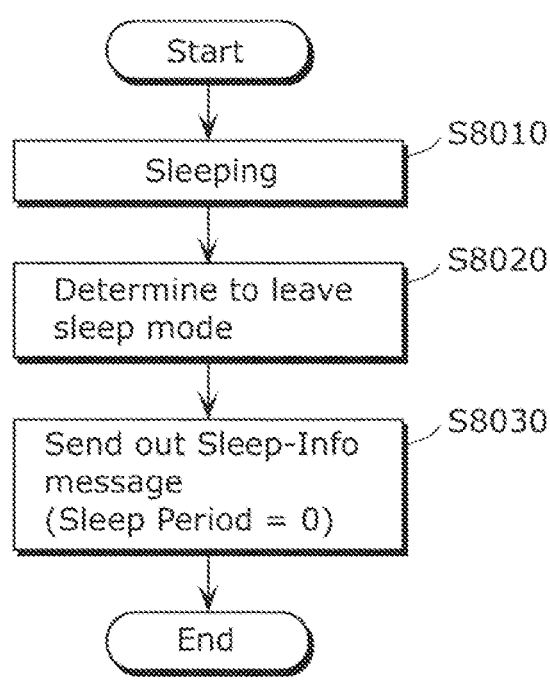
FIG. 8 is a flowchart for a master device according to Embodiment 1 that leaves sleep mode.

FIG. 8 is a flowchart showing the behavior of a master device during sleep mode. The master device is already operating in sleep mode (S8010). Next, the Local Sleep Management Unit 4020 of the master device decides to leave sleep mode and resume active mode (S8020).

Then, the master device wakes up and starts receiving messages. At the same time, the Local Sleep Management Unit 4020 of the master device creates a Sleep-Info message with the Sleep Period 2010 set to zero. After that, the created Sleep-Info message is either broadcasted or unicasted by the Local Sleep Management Unit 4020 (S8030).

At this time, the Sleep-Info message may be broadcasted or unicasted. Furthermore, an acknowledgement is not essential.

[Receiving Behavior of Existing Slave Device]

Figure 9:
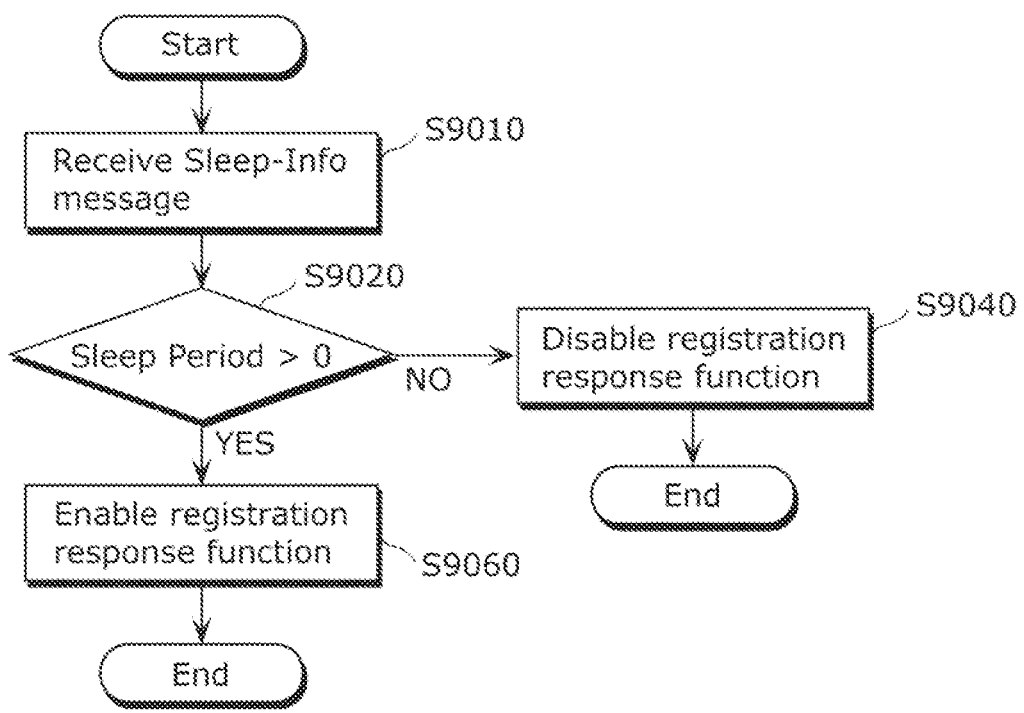
FIG. 9 is a flowchart for a slave device according to Embodiment 1 that receives notification from a master device.

FIG. 9 is a flowchart showing the behavior of an existing slave device. The External Sleep Management Unit 4030 of the existing slave device receives .a Sleep-Info message (S9010). Then, the External Sleep Management Unit 4030 checks the Sleep-Period 2010 and determines whether or not its value is larger than zero (S9020).

When the value of the sleep period is not larger than zero (No at S9020), i.e., equal to or smaller than zero, the External Sleep Management Unit 4030 disables the registration response function of the Registration Response Unit 4040 (S9040). This causes the slave device not to respond to received messages pertaining to registration requests from other devices.

Meanwhile, when the value of the sleep period is larger than zero (Yes at S9020), the External Sleep Management Unit 4030 enables the registration response function of the Registration Response Unit 4040. This causes the slave device to respond to messages pertaining to registration requests from other devices (S9060).

[Detecting Behavior of Existing Slave Device]

Figure 10:
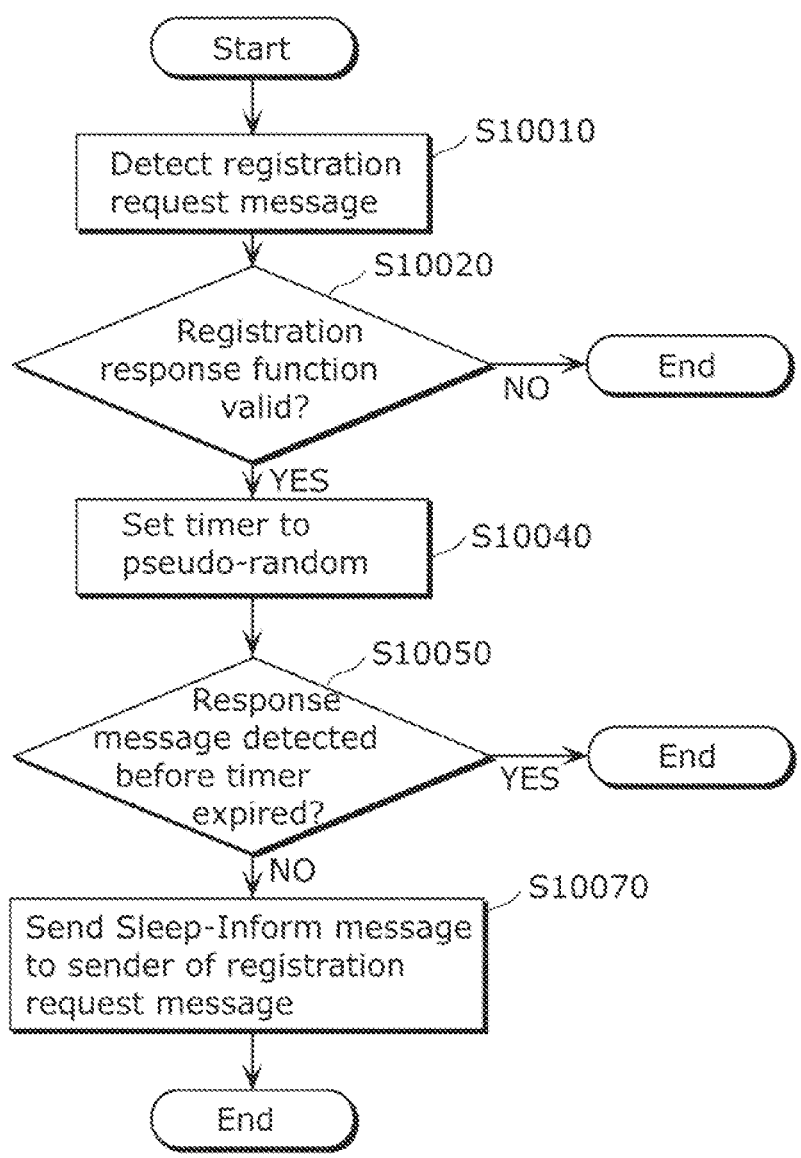
FIG. 10 is a flowchart for a slave device according to Embodiment 1 that detects a registration request.

FIG. 10 shows a flowchart of a response by an existing slave device. The Registration Response Unit 4040 of the existing slave device detects messages pertaining to registration requests (S10010). Then, the Registration Response Unit 4040 checks whether or not its registration response function is valid (S10020). When its registration response function is invalid (No at S10020), the Registration Response Unit 4040 ends processing.

Meanwhile, when its registration response function is valid (Yes at S10020), the Registration Response Unit 4040 sets a timer value to a pseudo-random value and starts the timer (S10040). It is preferable that the timer value have a random component. In addition, the timer value may be within a bounded or predetermined range. The timer value may also be determined depending on policies or preferences.

During the time before the above-mentioned timer expires, the Registration Response Unit 4040 monitors any response to registration request messages from new devices (S10050). Then, when the Registration Response Unit 4040 did not detect a response (No at S10050), it sends information on the sleeping master device as a Sleep-Inform message to the originators of the registration request messages.

Meanwhile, when any response to the registration requests was detected (Yes at S10050), it is assumed that other device has already sent the Sleep-Inform message as a response. Thus, the existing slave device ends processing.

[Registration Request Behavior of New Device]

Figure 11:
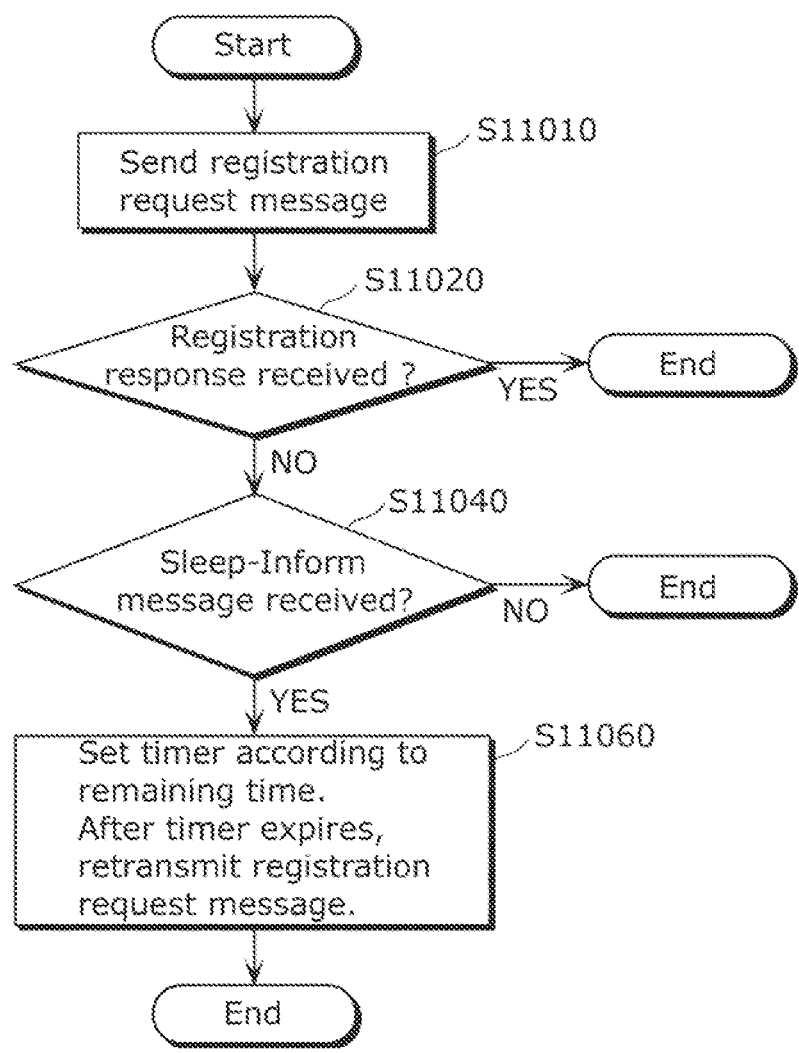
FIG. 11 is a flowchart for a new device according to Embodiment 1 that requests registration to a master device.

FIG. 11 shows the behavior when a new device, which is about to enter the home network 1001, sends a registration request message. First, the new device sends a message requesting registration (S11010).

After that, the new device waits for a predetermined time to see whether or not there is a response suitable for registration procedures (S11020). If there is a response (Yes at S11020), the new device ends registration processing. If there is no response (No at S11020), the new device checks whether or not a Sleep-Inform message has been received (S11040).

When receiving the Sleep-Inform message (Yes at S11040), the new device sets to its time value, the time when the master device designated by the Sleep-Inform message will enter active mode, i.e., the master device can receive messages. This value may be the Remaining Time 3010 within the Sleep-Inform message. The new device waits until the timer expires. After the timer expires, the new device retries the registration procedures (S11060).

At this time, the new device may place its terminal into sleep mode until the timer expires. In this case, the new device wakes up after the timer expires. This enhances a power saving effect.

[Energy Profile Dependent Response]

The Registration Response Unit 4040 may vary an aspect of its response processing according to the current energy status, profile or policy of the device. For example, the Registration Response Unit 4040 of a battery operated device may wait for a longer period of time before sending a response. If possible, it is preferable that a mains-powered device respond as vast amounts of power are consumed for transmission. Adjusting the above-mentioned waiting time increases the possibility that the mains-powered device responds.

Furthermore, the Registration Response Unit 4040 may determine the type of a Sleep-Inform message to be sent to a new device, depending on the energy profile. For example, the Registration Response Unit 4040 of a battery operated or otherwise energy constrained device sends a short Sleep-Inform message. Meanwhile, a battery operated device performs a more energy demanding proxy registration procedure on behalf of the sleeping master device. In this way, a notification method may be selected according to the energy profile.

As mentioned above, a communications terminal according to Embodiment 1 receives a Sleep-Info message when a controlling terminal goes into sleep. When detecting a registration request from a new terminal, the communications terminal sends a Sleep-Inform message to the new terminal. This allows the communications terminal to notify the new terminal of the wake-up timing of the controlling terminal. Then, the new terminal can stop sending registration requests until the arrival of the timing. Accordingly, a power saving effect increases.

Furthermore, in the above-mentioned description, different expressions: Sleep-Info message and Sleep-Inform message are independently used. However, these messages may virtually be a same message including wake-up timing. Therefore, theses messages may be given a same name as a sleep message.

In addition, the communications terminal may create a Sleep-Inform message by receiving and processing a Sleep-Info message. At which time, IEs included in the Sleep-Info message may be added, modified or deleted.

[Embodiment 2]

Next, the following describes Embodiment 2 according to the present invention.

In the above-described embodiment 1, when a new device requests registration to a sleeping master device, the new device waits until the master device wakes up. Then, after waiting, the new device requests registration to the master device. This is why the waiting is necessary. Therefore, a situation may occur such that the user cannot register the new device when she/he wants.

Therefore, in Embodiment 2, when a master device is sleeping at the time the user wants to register a new device, a slave device notifies the user of procedures to wake up the master device. This allows the user to register the new device when she/he wants. The following describes Embodiment 2 with reference to drawings.

Figure 12:
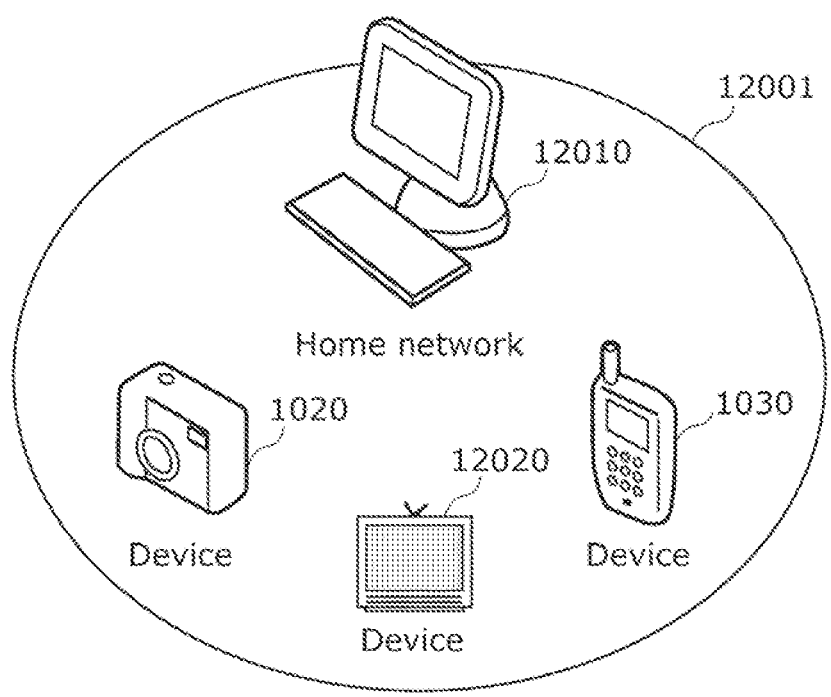
FIG. 12 is a diagram of network configuration according to Embodiment 2.

FIG. 12 is a diagram of network configuration according to as Embodiment 2. The home network 12001 shown in FIG. 12 has four Devices 1020, 1030, 12010 and 12020. The home network 12001 is an example of communications networks. The home network 12001 is typically a network within a home. In addition, the home network 12001 may be wired or wireless.

In FIG. 12, the Device 12010 is a master device which manages the home network 12001. The Devices 1020 and 12020 are existing slave devices. The Device 1030 is a new slave device which is yet to be registered in the master device. In particular, the Device 12020 has display function. The role of the master device and the relation between the master device and the slave device are same as those of Embodiment 1.

Figure 13:
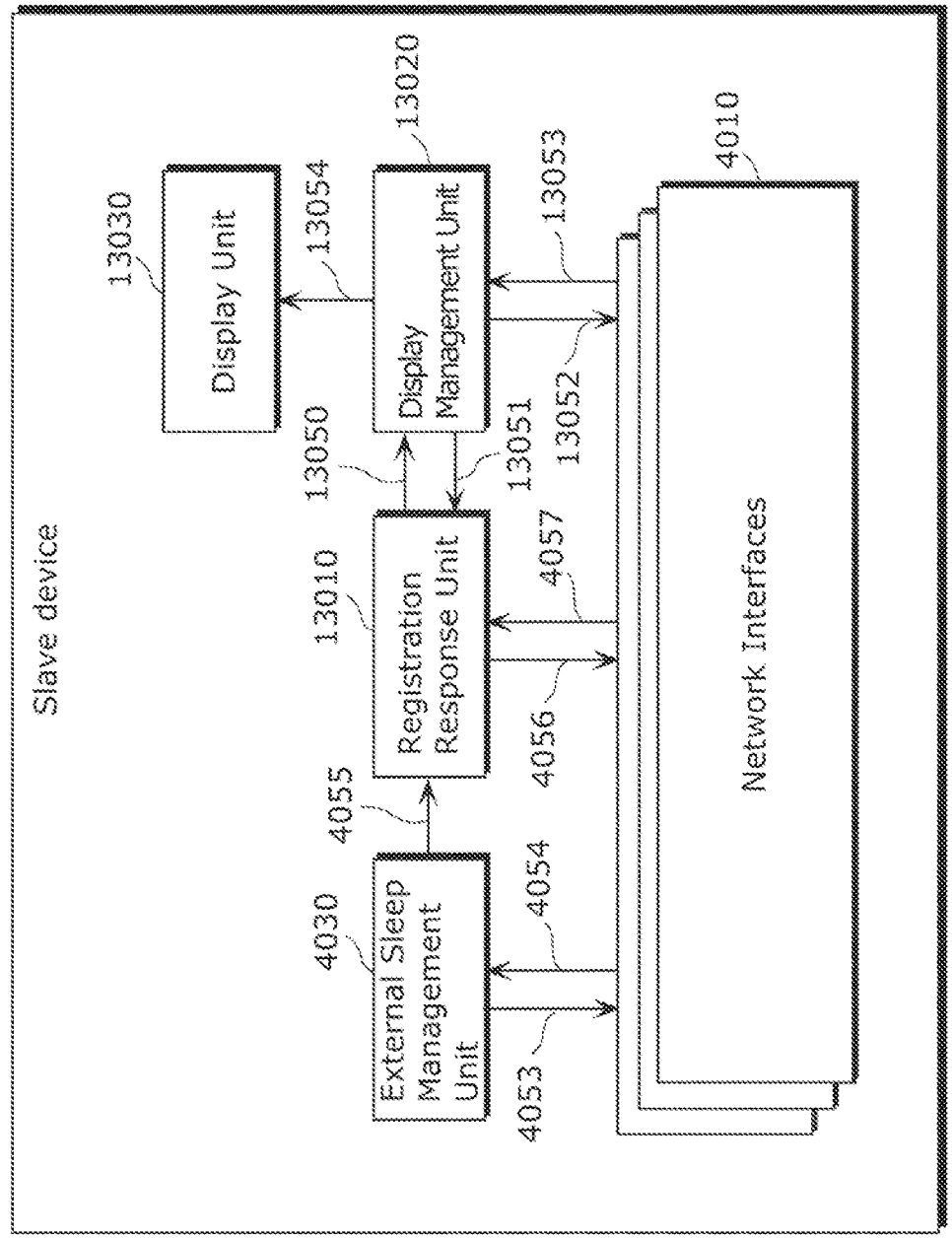
FIG. 13 is a block diagram of a slave device according to Embodiment 2.

FIG. 13 is a block diagram of the Device 12020 according to Embodiment 2. Note that in FIG. 13, the same reference numbers are given to the components same as those illustrated in FIG. 4. Here, different points from FIG. 4 are described.

The Registration Response Unit 13010 detects a message pertaining to a registration request via the Network Interfaces 4010 and path 4057. Then, the Registration Response Unit 13010 determines whether or not the External Sleep Management Unit 4030 is instructing the Registration Response Unit 13010 to respond to messages pertaining to registration requests.

Here, the Registration Response Unit 13010 ends processing when it is not instructed to respond to the registration request messages. Meanwhile, the Registration Response Unit 13010 sends a display request to the Display Management Unit 13020 via path 13050 when it is instructed to respond to the registration request messages.

Then, when receiving an acknowledgement of the display request from the Display Management Unit 13020, the Registration Response Unit 13010 ends processing. Meanwhile, when receiving a reply of the failed display request, the Registration Response Unit 13010 creates a Sleep-Inform message to send it to the device requesting registration.

The Display Management Unit 13020 receives the display request via the Network Interfaces 4010 and path 13053. Then, when the slave device has display function, the Display Management Unit 13020 requests the Display Unit 13030 to display the message that asks the user to power on the master device. At this time, the display request is sent to the Display Unit 13030 via path 13054.

After that, the Display Management Unit 13020 sends an acknowledgement of the display request via path 13052 and the Network Interfaces 4010.

Furthermore, the Display Management Unit 13020 receives the display request from the Registration Response Unit 13010. Then, the Display Management Unit 13020 sends to the Display Unit 13030 of the device, the display request which instructs the user to power on the master device. In addition, the Display Management Unit 13020 sends an acknowledgment of the display request to the Registration Response Unit 13010 via path 13051.

Then, when the device does not have display function, or when the device has display function but failed to display, the Display Management Unit 13020 sends the display request message which instructs other device within the network to power on the master device. The display request message is sent via path 13052 and the Network Interfaces 4010. Note that even when the device succeeded in displaying, it may send a display request.

Then, the Display Management Unit 13020 ends processing when receiving an acknowledgement message of the display request from the other device within the network, which notifies that the display was successful. Meanwhile, when not receiving the acknowledgement message of the display request although the waiting time for the acknowledgment has passed, it sends a reply of the failed display request to the Registration Response Unit 13010.

Note that the message format shown in FIG. 2 may be used as a display request message and as an acknowledgement message of a display request. In such a case, the Type 2001 may indicate that the message is the display request message or the acknowledgement message of the display request. Alternatively, other format message may be used.

In addition, the display request message may be broadcasted or unicasted. When the message is unicasted, the Display Management Unit 13020 may in advance manage a list of devices within the network having display function.

In addition, the Display Management Unit 13020 may set a randomized waiting time before sending the display request message. This reduces the risk of packet collisions on the media. In this case, the Display Management Unit 13020 starts a timer of a bounded randomized value and places the transmission of the display request message on standby until the timer expires. When the timer expires without a display request message being received from the other device, the Display Management Unit 13020 creates a display request message to send it to the other devices within the network.

The Display Unit 13030 receives the display request from the Display Management Unit 13020. Then, the Display Unit 13030 displays a message to notify the user to power on the master device. At this time, any display method may be used as far as it can identify the master device. Furthermore, user notification is not limited to display. User notification methods should inform the users that the master device is powered off. For example, user notification methods may be audio notification.

Figure 14:
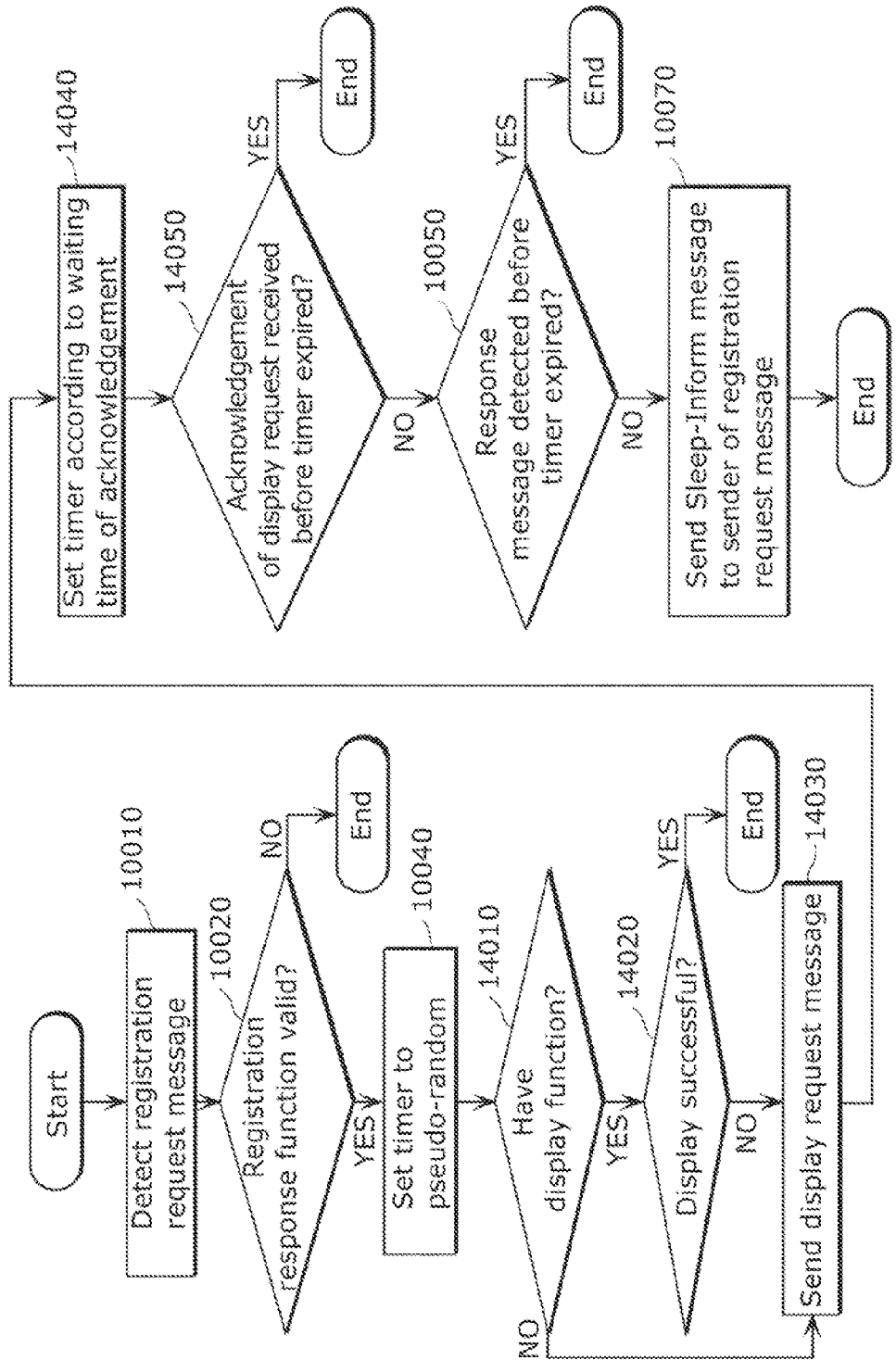
FIG. 14 is a flowchart for a slave device according to Embodiment 2 that detects a registration request.

FIG. 14 is a flowchart of the registration response processing of the Device 12020 according to Embodiment 2. Note that in FIG. 14, the same reference numbers are given to the processing same as that illustrated in FIG. 10. Here, different points from FIG. 10 are described.

After setting a pseudo-random timer (S10040), the existing slave device determines whether or not the device has display function (S14010). When having the display function (Yes at S14010), the slave device displays a message to instruct to power on its master device.

When the slave device succeeded in displaying (Yes at S14020), it ends processing. Meanwhile, when the slave device failed to display (No at S14020) or does not have the display function (No at S14010), it sends a display request message to the other devices within the network (S14030).

Here, the slave device may send the display request message to the devices close to it rather than sending to all the devices within the network. Thus, unnecessary display on some devices is reduced. For example, the slave device may gradually increase the transmission power of broadcasted display requests. More specifically, the slave device gradually increases power and send multiple display requests until a device which responds to one of the display requests appears. Thus, a neighboring device responds to the display request.

Further, the device which received a display request may display an instruction to power on the master device only when the intensity of receiving voltages is larger than a predetermined threshold. Thus, the device close to the device which sent the display request displays an instruction. Furthermore, among the devices which received the broadcasted display request, the device which is running specific applications may only respond to the display request. This enables to switch the devices displaying the instruction.

After sending the display request, the slave device sets a waiting time for receiving an acknowledgement message of the display request as a timer value, and resume the timer (S14040). Then, the slave device determines whether or not the acknowledgement of the display request has been received before the timer expires (S14050).

When the slave device received the acknowledgement of the display request (Yes at S14050), it ends processing. Meanwhile, when the slave device failed to receive the acknowledgement of the display request before the timer expires (No at S14050), it checks whether or not it has detected a Sleep-Inform message before the pseudo-random timer set in the previous processing (S10040) expires.

In addition, when the Registration Response Unit 13010 sets a randomized waiting time before sending a Sleep-Inform message, it is preferable that the waiting time be set longer than the length of time that the display processing (S14010-S14050) completes. Thus, display is given priority. Therefore, when there is a device having display function, a new device will be registered at user's desired timing.

[Embodiment 3]

The following describes the characteristic components of Embodiment 1 and 2 as Embodiment 3.

Figure 15:
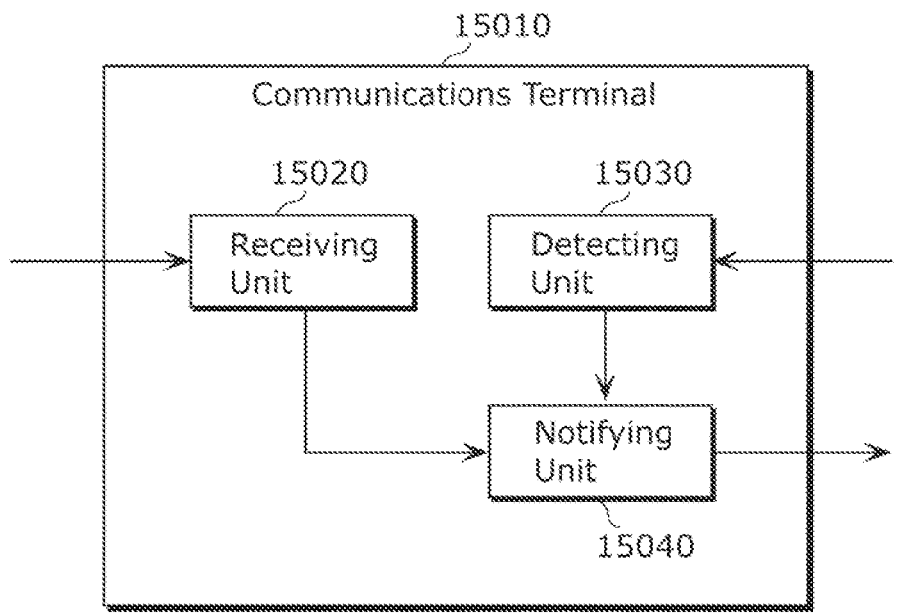
FIG. 15 is a block diagram of a communications terminal according to Embodiment 3.

FIG. 15 is a block diagram of a communications terminal according to Embodiment 3. The Communications Terminal 15010 shown in FIG. 15 is a communications terminal to be registered as a controlled terminal to a controlling terminal. Here, the controlling terminal is the communications terminal which controls the controlled terminal via the communications network. The controlling terminal corresponds to the master devices illustrated in embodiment 1 and 2. More specifically, the controlling terminal corresponds to the Device 1010 in Embodiment 1 and also to the Device 12010 in Embodiment 2.

Then, the Communications Terminal 15010 shown in FIG. 15 corresponds to existing slave devices illustrated in Embodiment 1 and 2. More specifically, the Controlling Terminal 15010 corresponds to the Device 1020 in Embodiment 1 and also to the Device 12010 in Embodiment 2. Then, the Communications Terminal 15010 has the Receiving Unit 15020, the Detecting Unit 15030 and the Notifying Unit 15040.

The Receiving Unit 15020 corresponds to the External Sleep Management Unit 4030 shown in FIG. 4. The Detecting Unit 15030 and the Notifying Unit 15040 correspond to the Registration Response Unit 4040 shown in FIG. 4.

Figure 16:
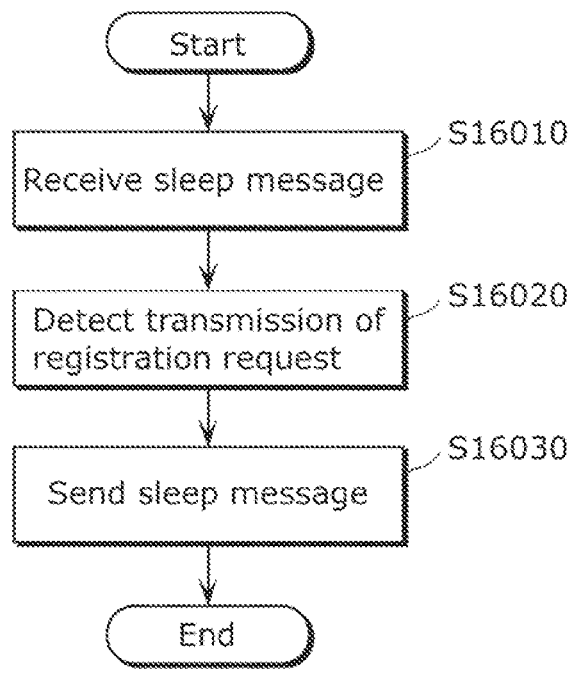
FIG. 16 is a flowchart showing the processing of a communications terminal according to Embodiment 3.

FIG. 16 is a flowchart illustrating the processing of the Communications Terminal 15010 shown in FIG. 15.

First, the Receiving Unit 15020 receives a sleep message (S16010). The sleep message includes information indicating whether or not the controlling terminal is sleeping and information indicating the timing when the controlling terminal leaves sleep mode and wakes up.

Next, the Detecting Unit 15030 detects the transmission of a registration request (S16020). The registration request is a signal requesting that a new terminal be registered in the controlling terminal as a new controlled terminal. The new terminal is another communications terminal which is yet to be registered in the controlling terminal.

The Notifying Unit 15040 determines whether or not the controlling terminal is sleeping based on the sleep message. Then, when the controlling terminal is sleeping and when the transmission of the registration request is detected, the Notifying Unit 15040 sends the sleep message (S16030). This notifies the new terminal of the timing.

Figure 17:
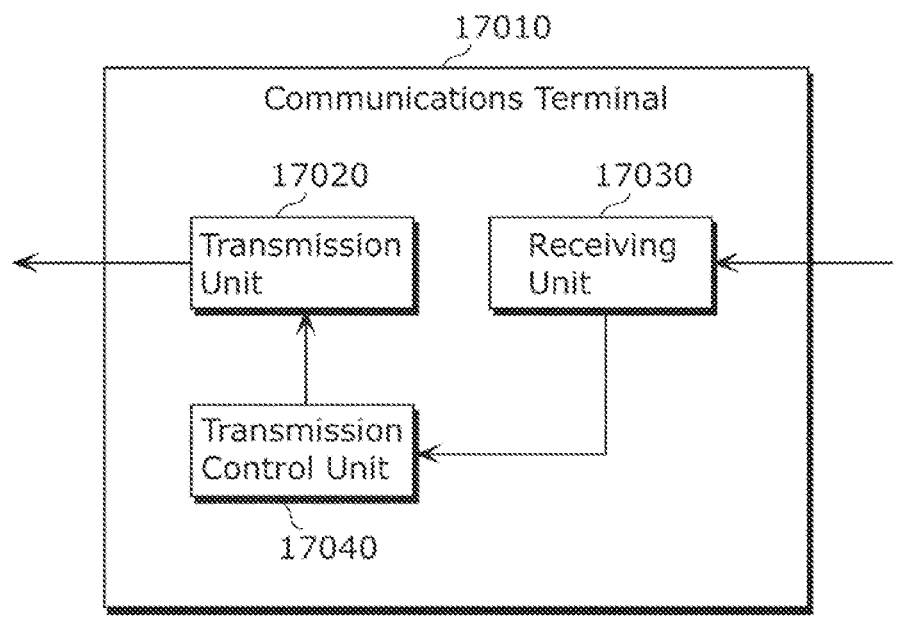
FIG. 17 is a block diagram of a new communications terminal according to Embodiment 3.

FIG. 17 is a block diagram of a new communications terminal according to Embodiment 3. The Communications Terminal 17010 shown in FIG. 17 is a communications terminal to be registered as a new controlled terminal to a controlling terminal.

The Communications Terminal 17010 corresponds to the new slave device illustrated in Embodiment 1 and 2. More specifically, the Communications Terminal 17010 corresponds to the Device 1030 illustrated in Embodiment 1 and 2. Then, the Communications Terminal 17010 has the Transmission Unit 17020, the Receiving Unit 17030, and the Transmission Control Unit 17040.

Figure 18:
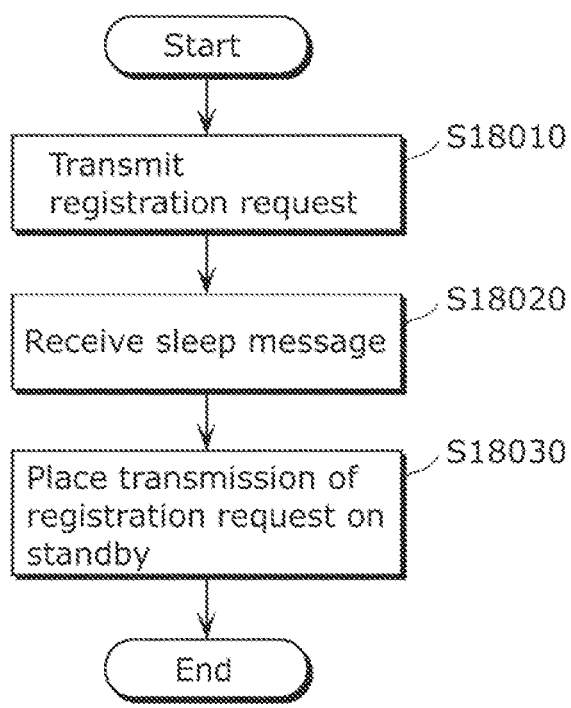
FIG. 18 is a flowchart showing the processing of a new communications terminal according to Embodiment 3.

FIG. 18 is a flowchart illustrating the processing of the Communications Terminal 17010 shown in FIG. 17.

First, the Transmission Unit 17020 sends to the controlling terminal, a registration request requesting that the Communications Terminal 17010 be registered as a new controlled terminal (S18010).

Next, the Receiving Unit 17030 receives a sleep message from other communications terminal registered in the controlling terminal (S18020).

Next, when receiving the sleep message, the Transmission Control Unit 17040 places the transmission of the registration request on standby (S18030). Then, the Transmission Control Unit 17040 controls the transmission of the registration request so that the registration request will be sent after the arrival of the wake-up timing.

Note that the above-mentioned sleep message includes information indicating whether or not the controlling terminal is sleeping and information indicating the timing when the controlling terminal leaves sleep mode and wakes up. The sleep message corresponds to the Sleep-Info message or the Sleep-Inform message illustrated in Embodiments 1 and 2. Then, both information indicating whether or not the controlling terminal is sleeping and information indicating the timing when the controlling terminal leaves sleep mode and wakes up correspond to the Sleep-Period 2010 shown in FIGS. 2 and 3.

As shown in Embodiments 1 and 2, two pieces of information included in the sleep message may be virtually illustrated as a piece of information.

In addition, the sleep message does not have to include information indicating the timing when the controlling terminal leaves sleep mode and wakes up. That is, the sleep message may only include information indicating that the controlling terminal is sleeping. The new terminal stops sending registration requests by being only notified that the controlling terminal is sleeping, leading to a power saving effect.

For example, the Receiving Unit 15020 of the Communications Terminal 15010 receives a sleep message indicating that the controlling terminal is sleeping. Then, the. Detecting Unit 15030 detects the transmission of a registration request. When the controlling terminal is sleeping and when the transmission of a registration request is detected, the Notifying Unit 15040 informs the new terminals by sending the sleep message, that the controlling terminal is sleeping. This allows the new terminal to recognize that the controlling terminal is sleeping.

Furthermore, in this case, it is preferable that the communications terminal have the function that informs the user that the controlling terminal is sleeping. For example, in this case, the communications terminal may be provided with the Display Unit 13030 and others shown in FIG. 13. In addition, the Notifying Unit 15040 may cause a display terminal, which is a communications terminal having the Display Unit 13030, to display.

Although the communications terminals according to the invention were described above based on multiple embodiments, the present invention is not limited to these embodiments. The present invention also includes embodiments obtained by making a transformation to these embodiments which those skilled in the art would find and other embodiments achieved by arbitrarily combining components in these embodiments.

For example, other processing units may perform the processing which is performed by a specific processing unit. Further, the order of processing may be changed and multiple processing may simultaneously be performed.

Note that similar methods as illustrated in the multiple embodiments may be applied to responses to various requests such as data transfer for sleeping nodes or data extraction. That is, the notification of sleep mode is not limited to only registration procedures.

In addition, in the above-mentioned multiple embodiments, multiple devices including master and slave nodes perform asynchronous communication. Then, multiple devices can work in energy-saving sleep mode. In addition, at which time, the inefficiency which arises when a new terminal ends up failing to communicate with a sleeping master device can be minimized. The communications terminals according to the present invention are particularly useful for data communications network provided within a home for interconnection between home appliances and other home appliances.

In addition, the present invention not only can be achieved as communications terminals but also as methods in which processing means constituting the communication terminals are steps. For example, these steps are performed by computers. Then, the present invention can be achieved as a program to cause computers to execute the steps included in these methods. Furthermore, the present invention can be achieved as a computer readable recording medium such as a CD-ROM and others in which the program is recorded. In addition, communications terminals illustrated in multiple embodiments may be computers.

In addition, multiple components included in communications terminals may be achieved as an integrated circuit Large Scale Integration (LSI). These components may be in separate chips or, also may be in one integrated chip including a part or all components. The name used here is LSI, but it may also be called Integrated Circuit (IC), system LSI, super LSI, or ultra LSI in accordance with the degree of integration.

Moreover, ways to achieve circuit integration is not only LSI, but also special circuit or general purpose processor can achieve the integration. FPGA (Field Programmable Gate Array) that can be programmed or reconfigurable processor that can re-configure the connection and setting of the circuit cells of LSI can also be used.

Furthermore, with advancement in semiconductor technology or by other derivative technologies, a new technology that can replace LSI may appear. Then, of course, the circuit integration of components included in the communication terminals can be done by that technology.

[Industrial Applicability]

The communications terminals according to the present invention can be applied to various communications terminals which communicate within a network and may particularly be useful for home appliances such as TVs, air conditioners or home security appliances, connected to home network.

Reference Signs List
1001, 12001 Home network
1010, 1020, 1030, 12010, 12020 Device
2001 Type
2010 Sleep Period
2020 Wake Period
3010 Remaining Time
3020 Source-Identifier
4010 Network Interfaces
4020 Local Sleep Management Unit
4030 External Sleep Management Unit
4040, 13010 Registration Response Unit
4051, 4052, 4053, 4054, 4055, 4056, 4057, 13050, 13051, 13052,
13053, 13054 path
13020 Display Management Unit
13030 Display Unit
15010, 17010 Communications Terminal
15020, 17030 Receiving Unit
15030 Detecting Unit
15040 Notifying Unit
17020 Transmission Unit
17040 Transmission Control Unit

The invention claimed is:

1. A communications terminal registered, as a controlled terminal, in a controlling terminal which controls the controlled terminal via a communications network, said communications terminal comprising:
a receiving unit configured to receive a sleep message including information indicating a timing when the controlling terminal leaves sleep mode and wakes up;
a detecting unit configured to detect a transmission of a registration request for requesting that a new terminal be registered in the controlling terminal as a new controlled terminal, the new terminal being another communications terminal not yet registered in the controlling terminal; and
a notifying unit configured to determine whether or not the controlling terminal is sleeping based on the sleep message, and to notify the new terminal of the timing by sending the sleep message when the controlling terminal is sleeping and when the transmission of the registration request is detected.

2. The communications terminal according to claim 1, wherein said notifying unit is configured to determine that the controlling terminal is not sleeping when a value of information is equal to or smaller than zero, and to determine that the controlling terminal is sleeping when the value is larger than zero, the information indicating the timing when the controlling terminal leaves sleep mode and wakes up.

3. The communications terminal according to claim 1, wherein said notifying unit is configured not to send the sleep message when the controlling terminal is not sleeping.

4. The communications terminal according to claim 1, wherein said receiving unit is configured to receive the sleep message including information indicating a length of time from when the controlling terminal wakes up till when the controlling terminal enters sleep mode next, and
said notifying unit configured to notify, by sending the sleep message, the new terminal of the length of time from when the controlling terminal wakes up till when the controlling terminal enters sleep mode next.

5. The communications terminal according to claim 1, wherein said notifying unit is configured to notify the new terminal of the timing by sending the sleep message to a relay destination terminal, and causing the relay destination terminal to relay the sleep message, the relay destination terminal being another communications terminal registered in the controlling terminal.

6. The communications terminal according to claim 1, wherein said notifying unit is configured to notify the timing by setting information in the sleep message and sending the sleep message, the information indicating a remaining time from when said receiving unit receives the sleep message till when the controlling terminal wakes up.

7. The communications terminal according to claim 1, wherein said notifying unit is configured to notify the timing by setting information in the sleep message and sending the sleep message, the information indicating a remaining time from when said detecting unit detects the transmission of the registration request till when the controlling terminal wakes up.

8. The communications terminal according to claim 1, wherein said receiving unit is configured to receive the sleep message relayed by a relay source terminal which is another communications terminal registered in the communications terminal.

9. The communications terminal according to claim 1, wherein a plurality of controlling terminals each of which is the controlling terminal sending the sleep message are configured to be provided on the communications network,
said receiving unit is configured to receive the sleep message including information to identify, from the controlling terminals, the controlling terminal which sent the sleep message, and
said detecting unit is configured to detect the transmission of the registration request to the controlling terminal identified by the sleep message.

10. The communications terminal according to claim 1, further comprising
a display unit configured to display sleep information indicating whether or not the controlling terminal is sleeping.

11. The communications terminal according to claim 1, wherein said notifying unit is further configured to send a display request to a display terminal that is a communications terminal provided with a display unit, and to cause said display unit to display sleep information, the display request for requesting the display of the sleep information indicating whether or not the controlling terminal is sleeping.

12. The communications terminal according to claim 11, wherein said notifying unit is configured to wait for a randomized time after said detecting unit detects the transmission of the registration request, and to send the display request to the display terminal in order to cause said display unit to display the sleep information.

13. The communications terminal according to claim 10, wherein said notifying unit is configured to cause said display unit to display the sleep information before notifying the new terminal of the timing.

14. The communications terminal according to claim 1, wherein said notifying unit is configured to notify the timing by notifying the time when the controlling terminal will wake up, the length of time from when the controlling terminal enters sleep mode till when the controlling terminal wakes up, or a predetermined sleep pattern.

15. A communications terminal comprising:
a transmission unit configured to transmit a registration request for requesting that the communications terminal be registered, as a new controlled terminal, in a controlling terminal which controls controlled terminals via a communications network;
a receiving unit configured to receive a sleep message including information indicating a timing when the controlling terminal wakes up, from a registered terminal which is another communications terminal registered in the controlling terminal; and
a transmission control unit configured to control a transmission of the registration request so that the transmission of the registration request is placed on standby and the registration request is sent after the arrival of the timing, when the sleep message is received.

16. The communications terminal according to claim 15, wherein said transmission control unit is configured to place the communications terminal itself into sleep mode during the time from the receipt of the sleep message until the arrival of the timing.

17. A communications method used in a communications terminal that is registered, as a controlled terminal, in a controlling terminal which controls the controlled terminal via a communications network, said communications method comprising:

receiving a sleep message including information indicating a timing from when the controlling terminal leaves sleep mode and wakes up;
detecting a transmission of a registration request for requesting that a new terminal be registered in the controlling terminal as a new controlled terminal, the new terminal being another communications terminal not yet registered in the controlling terminal; and
notifying the new terminal of the timing by determining whether or not the controlling terminal is sleeping based on the sleep message, and sending the sleep message when the controlling terminal is sleeping and when the transmission of the registration request is detected.

18. A non-transitory computer readable recording medium storing a program for causing the communications terminal to execute the communications method according to claim 17.

19. A communications method used in a communications terminal, said communications method comprising:
sending a registration request for requesting that the communications terminal be registered, as a new controlled terminal, in a controlling terminal which controls controlled terminals via a communications network;
receiving a sleep message including information indicating a timing when the controlling terminal wakes up, from a registered terminal which is another communications terminal registered in the controlling terminal; and
controlling a transmission of the registration request so that the transmission of the registration request is placed on standby and the registration request is sent after the arrival of the timing, when the sleep message is received.

20. A non-transitory computer readable recording medium storing a program for causing the communications terminal to execute the communications method according to claim 19.

* * * * *